3,310,450
FILM MOUNTER
Francis A. Dedona, Sherman Oaks, and James W. Lucas, Los Angeles, Calif., assignors to The Scionics Corporation, Canoga Park, Calif., a corporation of California
Filed Apr. 8, 1963, Ser. No. 271,401
17 Claims. (Cl. 156—514)

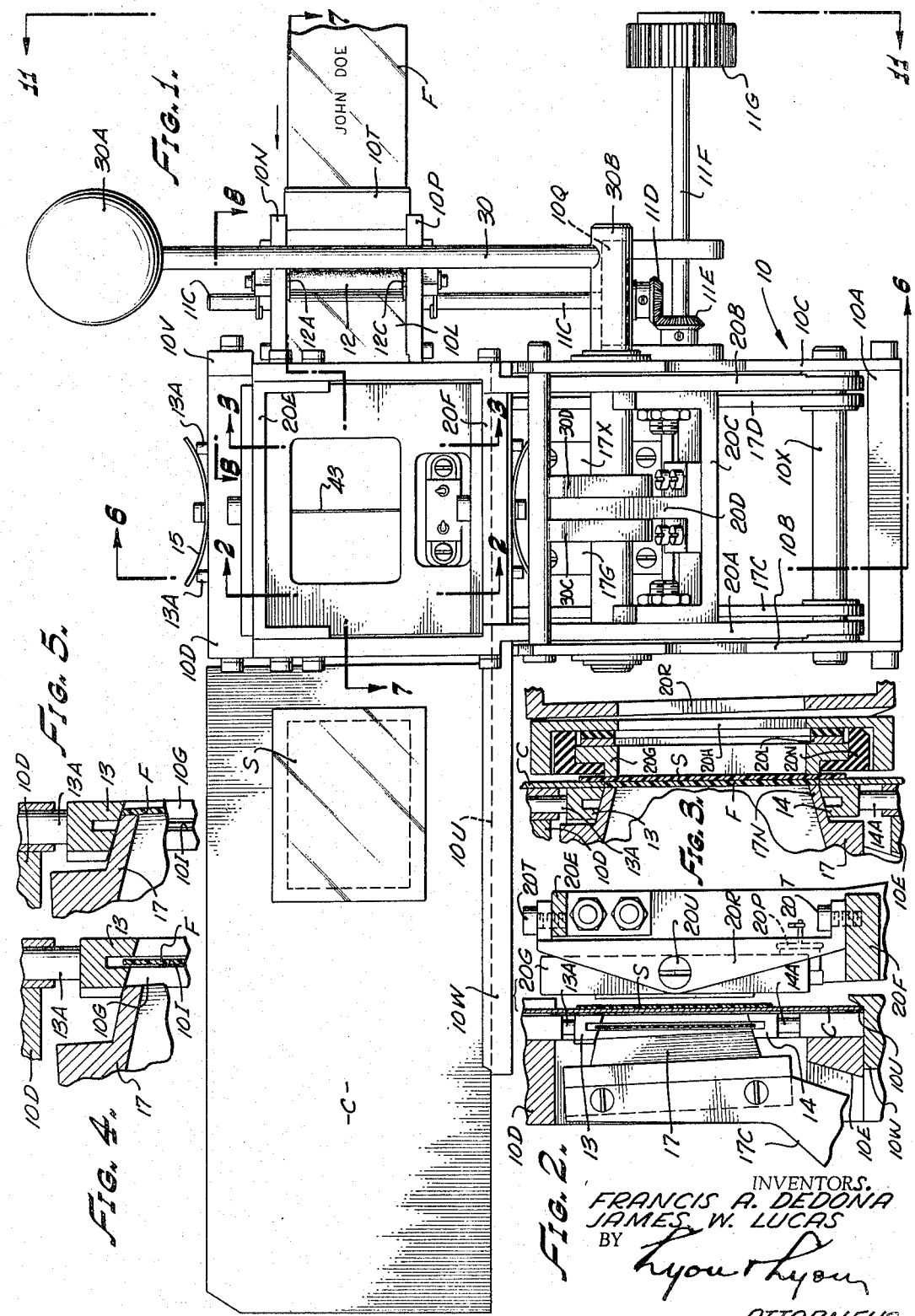

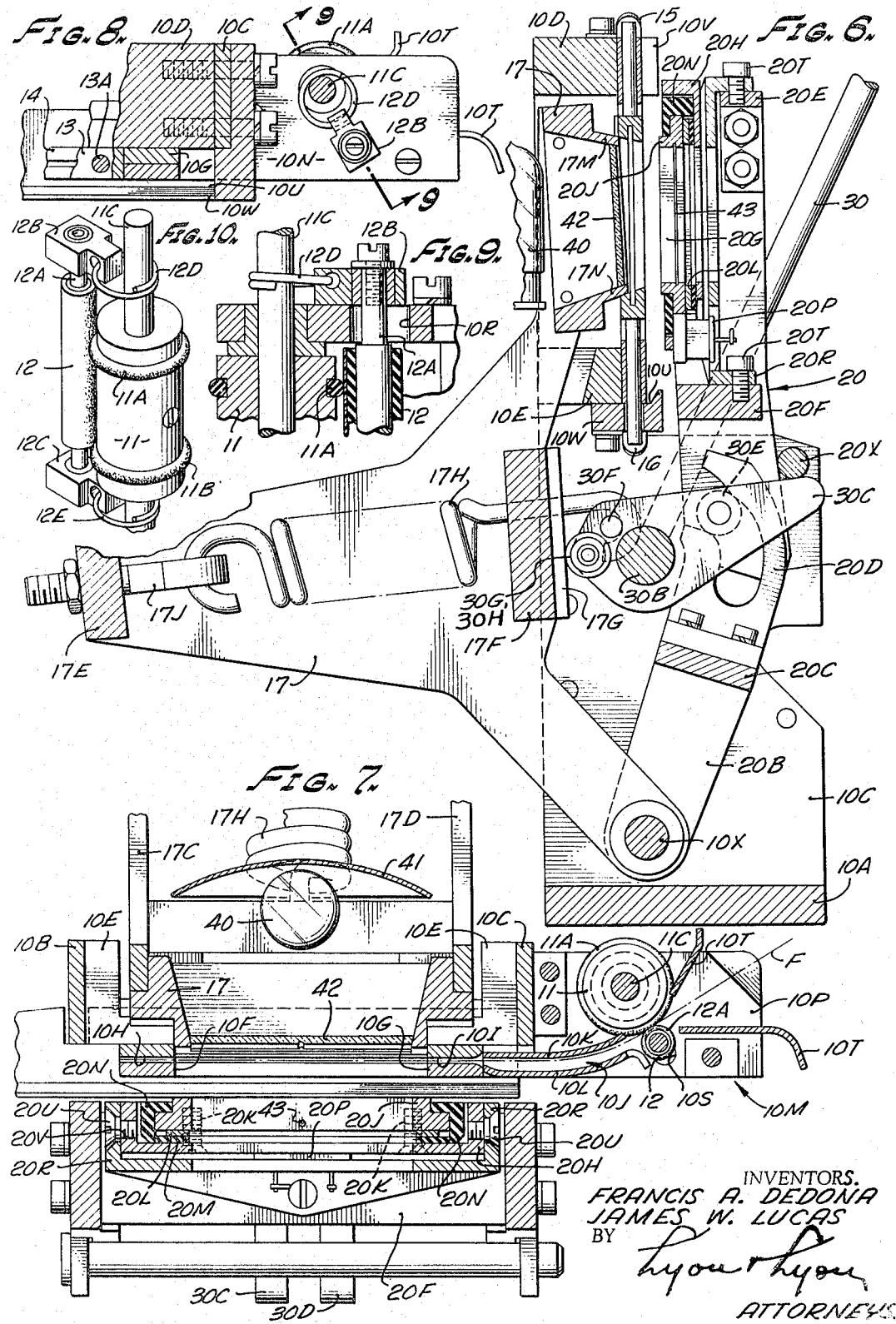

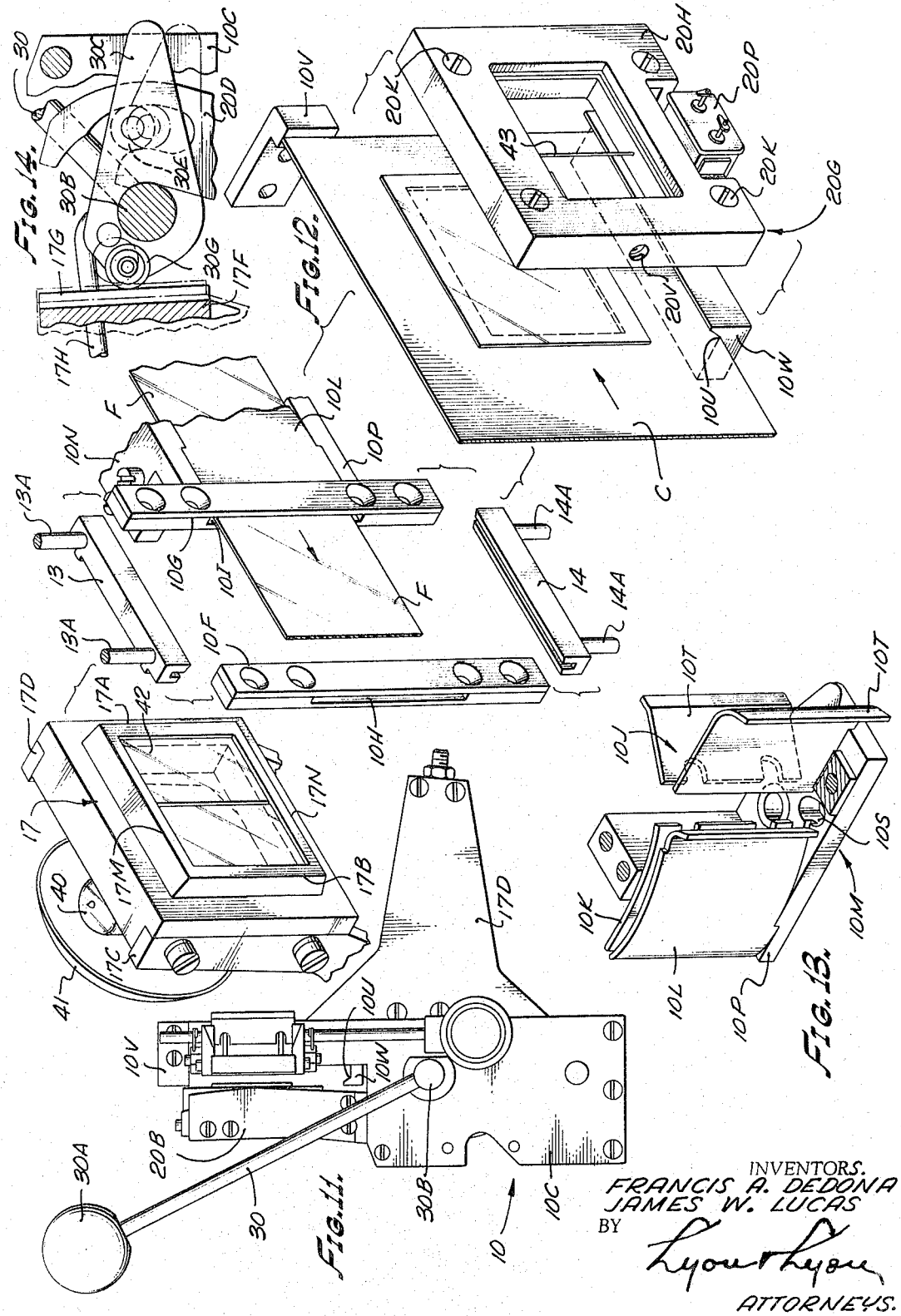

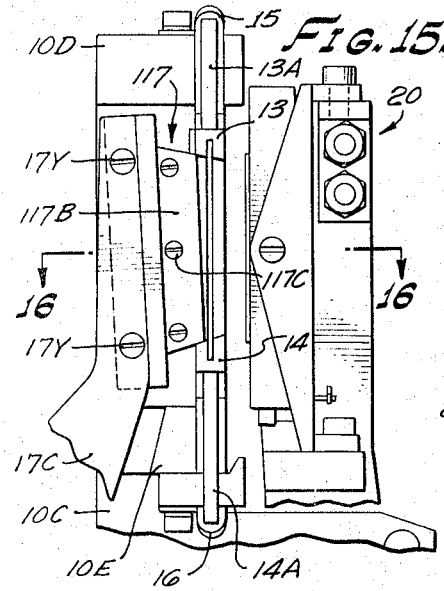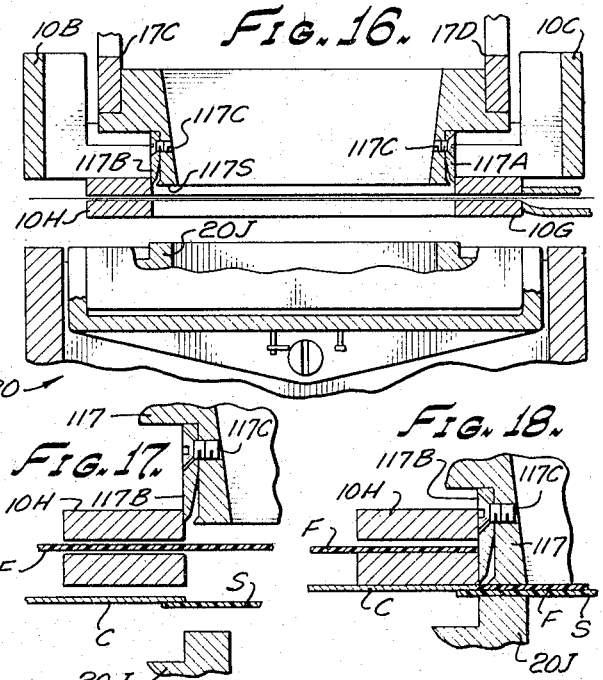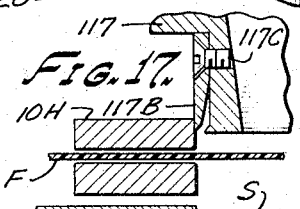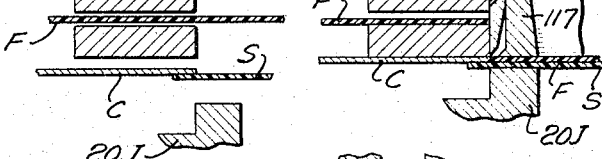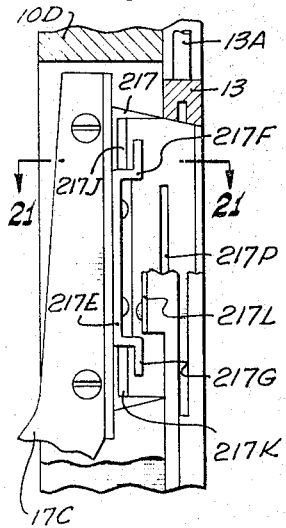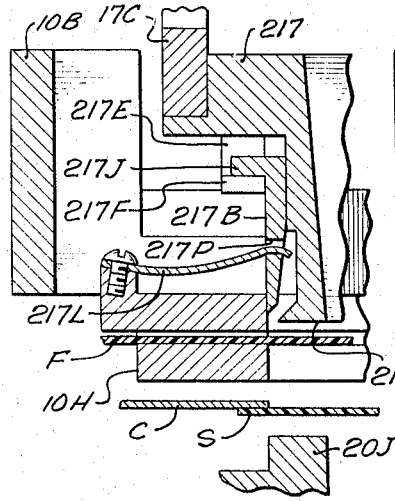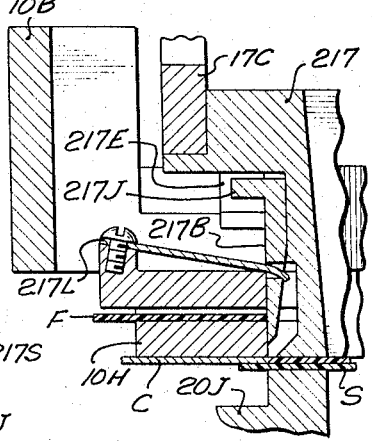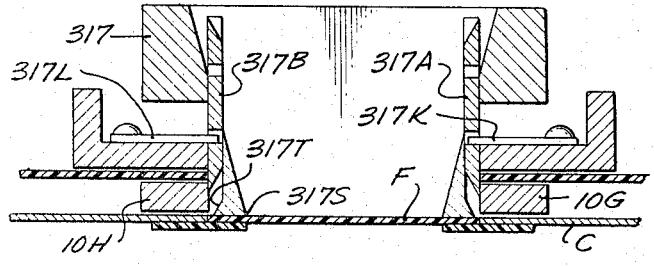

The present invention relates to a film mounter which is particularly useful in mounting a selected portion of film supplied from a roll in an apertured portion of a card having an adhesive sheet to which the film is bonded either with or in the absence of heat.

It is oftentimes desirable to mount film on an electric accounting machine type business card whereby information on the film may be carried on and be correlated with information on the card. This has been accomplished in the past by first providing the card with a rectangular apertured portion and an adhesive sheet over such apertured portion to achieve a means for bonding film up to such sheet and within the confines of such apertured portion. The present apparatus is capable of (1) accepting such cards so prepared, either with such adhesive sheet being apertured or nonapertured and either when the adhesive is pressure-activated or temperature-activated; (2) feeding film from a supply reel into exact registry with the card apertured portion to provide a selection of film; (3) cutting the selected portion of the film; and (4) bonding the cut film clip, either in the presence of or absence of heat, to the adhesive sheet.

It is therefore a general object of the present invention to provide an improved film mounted of this general character.

A specific object of the present invention is to provide an improved mounter of this character which is simple, rugged and easy to operate with a minimum amount of instructions.

Another specific object of the present invention is to provide an improved mounter of this character that assures uniformity in results.

Another specific object of the present invention is to provide an improved mounter of this character which may be operated either manually or mechanically as, for example, by a solenoid or motor, such that the film-cutting action is dependent exclusively on the energy stored in a spring so that excessive forces applied to the mounter have no influence on the cutting and mounting of the film.

Another specific object of the present invention is to provide an improved mounter of this character that allows an operator to at all times observe the film before cutting, during cutting and while being mounted.

Another specific object of the present invention is to provide an improved mounter of this character in which film is cut by cutting edges functioning as scissors.

Another specific object of the present invention is to provide a mounter of this character in which the film is cut along two parallel spaced lines extending transversely of the film with spaced film guides serving as elements of different pairs of scissors.

Another specific object of the present invention is to provide an improved film mounter of this character in which operation of an element automatically results in providing a backing for the adhesive sheet and for achieving a cutting and mounting of the film while the adhesive sheet is so backed.

Another specific object of the present invention is to provide a mounter of this character that involves a pivoted cutting frame member having two parallel cutting edges which cooperate with a corresponding film guide to cut a selected portion of film.

Another specific object of the present invention is to provide an arrangement as set forth in the preceding paragraph in which the cutting frame member serves, during its pivotal movement, to cam a pair of temporary film guides from cooperation with the film.

Another specific object of the present invention is to provide a mounter of this character in which the backing for the card adhesive sheet as well as the cutting element are both pivoted about a common axis and with a backing element being adjustably supported so as to achieve exact registration between cut film and the card.

Another specific object of the present invention is to provide a mounter of this character which incorporates novel mechanism whereby actuation of a single member results in pivoting of both a backing element and a cutting element.

Another specific object of the present invention is to provide an improved mounter of this character which incorporates an improved film-feeding mechanism.

Another specific object of the present invention is to provide an improved mounter of this character in which a spring may be adjusted to assure a predetermined and uniform film-cutting and mounting pressure and action.

Another specific object of the present invention is to provide an improved mounter of this character that involves an apertured adhesive sheet backing member such that the backing member may be heated and also allow visual observation of the film while it is being aligned, while it is being cut and while it is being mounted on the adhesive sheet.

Another specific object of the present invention is to provide an improved mounter of this character in which film selection, cutting and mounting are all accomplished at a single station.

Another specific object of the present invention is to provide a mounter of this character having constructional features involving built-in dwell times that allow its adaptation to uses in other assemblies and particularly to operation by motive power such as a solenoid or motor.

Another specific object of the present invention is to provide a mounter of this character which allows convenient access to all elements at all film-cutting and film-bonding station for ease of cleaning and servicing.

Another specific object of the present invention is to provide a mounter of this character in which uniformity of bonding pressure along a peripheral area is assured by a backing pad universally mounted for two degrees of freedom and incorporating an elastic element that eliminates metal-to-metal contact, the universal mounting being particularly advantageous in providing self-adjustment for wear and lack of rigid dimensional tolerances.

Another specific object of the present invention is to provide an improved mounter of this character in which the film for cutting purposes is supported as a cantilever at its film-feeding rollers and a pivoted cutter frame having two cutting edges thereon cooperating respectively with edges of a film guide to provide two pairs of scissors, with one such pair serving to sever the film from the roll and the other pair serving to trim the leading edge of the film.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 is a view in front elevation of the mounter.
FIGURES 2 and 3 are sectional views taken substantially along lines 2—2 and 3—3, respectively, in FIGURE 1.

FIGURES 4 and 5 are enlarged views of some of the elements in FIGURE 3 in different operating positions.

FIGURE 6 is a sectional view taken substantially on the line 6—6 in FIGURE 1.

FIGURES 7 and 8 are sectional views taken substantially along corresponding lines 7—7 and 8—8 in FIGURE 1.

FIGURE 9 is a sectional view taken substantially along line 9—9 in FIGURE 8.

FIGURE 10 is a perspective view showing film-engaging rollers of the mounter.

FIGURE 11 is a side view as indicated by line 11—11 in FIGURE 1.

FIGURE 12 is a perspective view of film-cutting means, film-guiding means and heated movable pressing head in disassembled form.

FIGURE 13 is a perspective view of a portion of the mounter through which the film passes.

FIGURE 14 shows a portion of the apparatus in FIGURE 6 and shows different operating positions of the camming lever.

FIGURES 15–19 pertain to a modified construction, FIGURE 15 being a view in side elevation showing that portion of the film mounter which is modified, FIGURE 16 being a view taken substantially as indicated by the arrows 16—16 in FIGURE 15, FIGURES 17 and 18 showing a portion of the structure in FIGURE 16 in enlarged form and in different operating positions, and FIGURE 19 being a further enlargement of some of the structure shown in FIGURES 17 and 18.

FIGURES 20–22 pertain to another modified construction incorporated in the film mounter, FIGURE 20 showing a view in side elevation of the modified structure, FIGURE 21 being a sectional view taken generally as indicated by arrows 21—21 in FIGURE 20, and FIGURE 22 being a view like FIGURE 21 with parts in different operating position.

FIGURE 23 is a sectional view through another modified construction.

The apparatus includes a vertically extending and generally rectangularly apertured supporting frame 10 formed by a lower supporting base plate 10A, and two parallel and vertically extending spaced side plates 10B, 10C which are interconnected at their upper ends by two parallel and horizontally extending bar members 10D and 10E. A pair of parallel and vertically extending film guides 10F and 10G (FIGURE 12), are interconnected between bar members 10D and 10E, each of such guides comprising two abutting plates with one of such plates being grooved and cooperating with the adjacent plate to form a rectangular film opening 10H and 10I, respectively. Each of such film openings is horizontally aligned with the other and also with an end opening of a somewhat arcuate shaped stationary film guide chute 10J (FIGURE 7) comprising a pair of spaced sheet metal plates 10K, 10L mounted on a stationary subframe 10M having a top plate 10N and bottom plate 10P, both plates being secured to frame side plate 10C.

A film-feeding roller 11 having a pair of axially spaced film-engaging O-rings 11A and 11B recessed therein has its extended shaft 11C rotatably supported in the spaced plates 10N, 10P and also in a generally U-shaped bracket 10Q on side plate 10C. Shaft 11C has secured thereon a bevel gear 11D meshing with a bevel gear 11E on a shaft 11F which is suitably rotatably supported on the spaced frame plates 10C, 10B such that turning of the knob 11G on shaft 11F results in turning of the film-feeding roller 11.

A spring-urged film-energizing roller 12 of, for example, rubber or other soft material has the ends of its shaft 12A extending through lost motion slots 10R and 10S, respectively, in stationary plates 10N and 10P and within movable bearings members 12B, 12C. A pair of spring rings 12D, 12E extend respectively through an apertured portion of bearing members 12B and 12C and engage the roller shaft 11C to thereby urge the roller 12 against the O-rings 11A and 11B to resiliently clamp film therebetween and establish a driving connection for such film. To facilitate initial manual insertion of the film between the rollers 11 and 12, there is provided a pair of stationary angularly deposited sheet metal guide members 10T mounted between the subframe plates 10N, 10P to provide a throat which coverages towards the space between the rollers; and one of such plates 10T has an edge thereof provided with spaced grooved portions as shown in FIGURE 13 to provide clearance for the O-rings on roller 11.

To assure passage of the film F from apertured portion 10I into the aperture portion 10H (FIGURE 12) during a film-feeding operation, there is provided a pair of channeled film guide members 13 and 14 which, as described later, are actually moved apart during the film-cutting operation. These guide members 13, 14 are each provided respectively with a pair of pins 13A, 14A which, as shown in FIGURE 3, are slidably mounted in apertured portions in the stationary bars 10D and 10E with respect to which is mounted a corresponding double leaf spring 15, 16 for normally urging such film guides 13 and 14 inwardly towards opposite edges of the film so that, as shown in FIGURE 2, such edges extend into the channeled portion of the film guides 13, 14 with a member 17 (described later) serving as a stop member for limiting such inward movement of the film guides 13 and 14.

It is contemplated that a section of film, when positioned as shown in FIGURE 7, will be cut and mounted on a card C which is initially manually positioned so as to rest on a stationary horizontally extending card trough 10U with the upper righthand corner portion of such card engaging the stationary projection or card stop 10V, the card through 10U comprising in part a horizontal bar 10W with an upwardly extending projection or lip, as seen in FIGURE 6, secured to the stationary horizontal bar 10E. The previously mentioned pins 14A of film guide 14 pass also through apertured portions in this bar 10W and the double leaf spring 16, as seen in FIGURE 1, has an intermediate portion thereof mounted on bar 10W while the other double leaf spring 15 is mounted at a point intermediate its ends on bar 10D.

It is contemplated that during mounting of a cut film section on the card, indexed as described above, the cover sheet S on card C is suitably supported or backed to withstand pressure applied thereto simultaneously with the application of heat to a rectangular peripheral portion thereof lying within the card apertured portion and closely adjacent to the card edges which define the rectangular apertured portion of the card. For this purpose there is provided a pivoted support frame 20 having spaced legs 20A, 20B thereof pivoted on a stationary shaft 10X extending between stationary frame plates 10B, 10C. These legs 20A, 20B are connected by a first horizontal cross bar 20C on which a cam plate 20D is centrally mounted for movement of the supporting frame 20 in a manner described later and also by two horizontal cross bars 20E and 20F on which a generally rectangular and apertured heatable pressure pad 20G is adjustably mounted using a construction now described.

The heatable pressure pad 20G involves an outer apertured rectangular shallow pan-shaped metal enclosure member 20H (FIGURES 6 and 7) within which is mounted an open rectangular metal card cover sheet engaging member 20J which, as shown in cross section in FIGURES 6 and 7, is L-shaped with one of the legs of the L extending slightly outside of the general confines of the enclosure member 20H. Sandwiched between the other or base leg of the L and the enclosure member 20H by fastening screws 20K are an apertured electrical heating element 20L and an apertured sheet of heat-resistant elastic material 20M with the heating element 20L being in good heat-conducting relationship to the cover sheet engaging member 20J. A generally rectangular and L cross-sectional open frame of insulating material 20N is suitably fastened around the perimeter of the card sheet engaging member 20J between it and the supporting frame member 20H, and recessed from the adhesive sheet engaging surface of the member 20J.

This assembly, comprising the heatable pressure pad 20G, preferably has mounted thereon a thermostatically controlled switch 20P (FIGURES 6 and 12) which senses the temperature of the heater 20L and is connected in series with the electrical heater 20L to maintain its temperature as well as the temperature of the card sheet engaging member 20J substantially constant.

This heatable assembly 20G is adjustably supported on the arms 20A and 20B using the following construction that allows the card sheet engaging surface of element 20J to conform with the adjacent surface of the card sheet when such arms are moved towards the card. This construction involves an open frame gimbal bracket or mount 20R (FIGURES 2, 6 and 7), which is semiloosely fastened by screws 20T to the cross bars 20E, 20F with a pair of screws 20U passing through an intermediate apertured portion thereof and semiloosely threaded into the apertured portion 20V of pad member 20H to thereby allow automatic self-adjustment of the pad 20G about both a vehicle axis and a horizontal axis, i.e. the pad 20G is mounted so as to have two degrees of freedom about two perpendicular axes, the first axis being the axis of aligned screws 20T and the second axis being the axis of aligned screws 20U. This adjustment is considered desirable considering that the frame-carrying pad 20G pivots about a horizontal axis and it is desired that the entire inner card sheet engaging surface of the pad element 20J uniformly engage or back the card sheeet during the time that the cut film is being pressed into engagement with the opposite side of the card cover sheet in a manner now described in connection with the cutting of the film. This uniformity is further assured by the elastic sheet 20M (FIGURE 7) which eliminates metal-to-metal contact with the metal supporting frame 20H.

The film F is cut by a structure which is essentially two pairs of scissors which are mechanically interconnected to achieve substantially simultaneous cutting along two parallel spaced lines extending transversely of the film strip with cutting along one of such lines being for the purpose of severing or cutting off a film section from the film strip and with cutting along the other one of such lines being for the purpose of trimming the film section. The two pairs of scissors are thus referred to, for purposes of definition, as (1) the severing pair of scissors comprising cooperating edges of the stationary film guide 10G and an upwardly extending and movable edge 17A of an open rectangular frame member 17, and (2) the trimming pair of scissors comprising cooperating edges of the stationary film guide 10F and an upwardly extending edge 17B of the frame member 17 which may be either of one-piece construction as shown or an assembly of elements, this frame member 17 being mounted on a pair of arms 17C, 17D which are pivotable about the axis of the stationary shaft 10X and which are interconnected by a cross bar 17E and a cross bar 17F having a pair of hardened wear-resistant plates 17G and 17X mounted thereon for purposes described later.

An actuating lever 30, having the handle portion 30A, is pivotally mounted on the stationary frame with its shaft portion 30B being journalled for pivotal movement in the spaced stationary frame members 10B, 10C. This shaft portion 30B mounts a pair of plates 30C, 30D on opposite sides of the movable cam plate 20D and closely adjacent thereto for achieving rigid support for the cam rollers. Mounted between such plates 30C and 30D is a cam roller 30E for cooperating with the open and generally arcuate shaped cam slot in plate 20D as seen in FIGURES 6 and 14. Also mounted between such plates 30C, 30D is an anchor pin 30F for one end of a prestressed tension spring 17H. A pressure roller 30G and 30H mounted respectively on plates 30C, 30D engage the hardened wear resistant surfaces 17G and 17X which may comprise a single surface of only one plate. The spring 17H has its other end attached to an eye bolt 17J which is adjustably mounted on the cross bar 17E to adjust the tension of spring 17H. This spring 17H at all times serves to press the surface 17G against rollers 30G and 30H and the energy stored therein is used to cut the film such that the amount of force applied to the two pairs of scissors, as described above, is adjustable but once adjusted is substantially independent of the force being applied to the operating lever 30. This should be more clear from the following description.

When the lever 30 is rotated in a clockwise direction in FIGURE 6, the cam roller 30E progressively moves into the cam slot in arm 20D and in doing so causes the arm 20D and the heatable backing pad 20G to pivot in a counterclockwise direction (FIGURE 6) with such pivotal movement being arrested when the roller 30E approaches the end of the cam slot, at which time the exertion of additional manual force to the lever 30 produces no movement of the backing pad 20G, i.e., backing pad 20G is then maintained in a stationary position for heating and backing the cover sheet of a card. During this pivotal movement the rollers 30G and 30H on plates 30C and 30D rotate on wear-resistant plates 17G and 17X and tend to move away from plate 17G but the spring 17H causes the plate 17G and cutter frame 17 to follow such movement, producing clockwise movement (FIGURE 6) of the cutter frame 17 about the axis of shaft 10X. This pivotal movement of the cutter frame 17 tends to be resisted when and as the cutting edges 17A and 17B engage and cut the film but here again the spring 17H is sufficiently prestressed to overcome the resistance to movement offered by the film and energy stored in the spring is used exclusively in cutting the film.

It will be noted that, as illustrated in connection with FIGURES 2, 4, 5, and 6, the spring 17H performs an additional function in that it causes the temporary film guide members 13 and 14 to be cammed outwardly against the action of their biasing springs 15 and 16 respectively by cutter frame 17. More specifically, the horizontal portions 17M, 17N (FIGURE 12) of the cutting frame 17, serving no cutting function, act as cam members to cam the temporary guide members 13 and 14, respectively, to allow passage of the frame member 17 with its cutting edges 17A and 17B. It will be appreciated that since the film is supported as a cantilever at the film feeding roller the film guides serve as guides without the requirement that the film rest on the bottom of the film guide slots.

After the film is thus severed, continued movement of the frame 17, due to continued action of spring 17H and due to its engagement with the film section, causes it to be pressed into the indexed apertured portion of the card against the cover sheet thereon, the cover sheet at this time being backed by the heated pressure pad 20G as seen in FIGURE 3.

After the film chip is cut and carried forward into the apertured portion of the card, continued rotation of shaft 30B causes rollers 30G and 30H to move away from and be free of the wear-resistant surfaces 17G and 17X, thus further extending the spring 17H and effectively increasing the mechanical advantage of the lever system of cutting frame members 17C and 17D and the pressure pad support members 20A and 20B, as related to the distance between the center lines of pin 30F and shaft 30B. This action increases the force on the film chip by allowing the force from spring 17H to be effective about pivot 10X instead of about pivot 30G. The amount of pressure or force imposed at the junction of the surfaces formed by the face of the cutting frame 17 and the pressure pad 20G is limited by the total energy stored in the spring 17H at this point of maximum extension. No amount of additional force applied to the operating lever 30 will increase the amount of pressure actually applied between the film and adhesive sheet on the card. Thus, an important variable factor involving mounting pressure is eliminated and a desired pressure cannot be exceeded.

The card itself, as illustrated, is an electric accounting machine type business card which is modified to provide a rectangular apertured portion. The card apertured portion is covered by a cover sheet. The cover sheet is preferably a thin sheet of dimensionally stable material having a temperature-activated adhesive coated on one side thereof, i.e., that side which is immediately adjacent the card. Such adhesive secures the cover sheet to the card; and is heated to secure the film section to the cover sheet. Since the adhesive is temperature-activated, little pressure need be applied when the film section is being bonded to the cover sheet. The machine, however, is not limited in its use to any one particular type of card with a particular type of cover sheet and may, for example, be used when the cover sheet has a pressure-sensitive adhesive thereon, in which case the pad need not be heated and a switch may be provided to open or bypass the heater circuit. In some cases the cover sheet may comprise only one material which is plastic bonded to the film section, in which case the pad is heated. Other variations may involve a cover sheet which is rectangularly apertured and/or a cover sheet which is mounted on a shouldered portion of the card so that the planes of the cover sheet and card lie in substantially the same plane.

The operation of the machine may be described briefly as follows. The operator first places a card with its apertured portion covered by a cover sheet (either a full cover sheet or apertured cover sheet) on the card ledge 10U with the card being in a predetermined position due to engagement of the upper righthand corner portion of the card with the stationary card stop 10V. The operator then turns the knob 11G to feed the film through the film guide 10G and through the film guide 10H, the temporary film guides 13 and 14 being effective at this time to assure feeding of the leading edge of the film strip into the film guide 10H. During this film-feeding operation, the operator registers or aligns a particular selected section of the film with the card opening, this alignment being accomplished by visual observation; and to facilitate such observation, an illumination system is provided. The illumination system involves a small light bulb 40 and reflector 41 carried by the movable frame 17C, 17D, a translucent screen 42 mounted within the cutter frame 17 and a generally vertical cursor wire 43 centrally mounted on pad 20G so that light from such lamp is transmitted, in turn, through the screen 42, to film, and the transparent cover sheet on the card whereby the central portion of the selected film image thus observable may be aligned with the cursor wire 43 by manipulation of knob 11G. The film thus registered or aligned with respect to the card opening is then severed by the operator pulling down on the lever handle portion 30A.

When the lever 30 is pulled down, the plates 30C, 30D, carrying the rollers 30E and 30G, and 30H, are pivoted. The roller 30E, a cam roller, cooperates with the cam slot in arm 20D to pivot the heated backing pad 20G about the axis of shaft 10X to its position shown in FIGURE 3 to contact and provide a backing for the cover sheet. The other rollers 30G and 30 rotate on the wear-resistant plates 17G and 17X to allow the cutter frame 17 to pivot about the axis of shaft 10X towards the film under the influence of spring 17H and in so doing frame 17 cams the temporary guides 13 and 14 out of the way and with the cutting edges 17A, 17B of the frame 17 cooperating with the coresponding film guide edges of guides 10G and 10F to cut the film along two parallel lines. Pivoting of the film frame 17 under the influence of spring 17H continues to press the severed film section, as shown in FIGURE 3, into the apertured portion of the card and against the adhesive side of the cover sheet which is heated by pad 20G to activate the adhesive and produce a bond between the film and cover sheet.

The operator maintains the parts in the position shown in FIGURE 3 for a brief time, after which he releases the lever 30 to allow it to assume its normal position shown in FIGURE 6, after which the card with the film bonded thereto may be removed from shelf 10U. It is noted that pivotal movement of pressure pad 20G is limited by engagement of the frame arms 20A, 20B with a rod 20X that serves as a removable stop. To facilitate cleaning and servicing, rod 20X is removed to allow disengagement of cam roller 30E from cam plate 20D, thus permitting frame 20 to swing outwardly and forwardly to gain easy access to the film guides, film scissors, and card-engaging member 20J.

In FIGURES 15-19, the mounter is modified by substituting the cutter frame 17 for the cutter frame 117 which is secured to arms 17C, 17D by screws 17Y in like manner. The cutting means is now in the form of two straight flexible cutters 117A, 117B secured by screws 117C to the frame 117 with the rear edge portion of such cutters being backed by a shouldered portion of the frame 117. It will be seen in FIGURE 16 that these cutters 117A, 117B have an outer substantially flat surface and an inner sloped surface, with such surfaces terminating at a cutting edge with such sloped surface being progressively spaced along its length from the frame member so that these flexible shear blades resiliently press against the inner surfaces of the film guides. It will also be seen in FIGURE 19 that the cutting edge of the blades, represented by blade 117B, extends inwardly of the frame outer surface 117S a distance of approximately two thousandths of an inch (.002") to assure contact of surface 117S with the film F and the pressing of the film against the film guides before the cutting is accomplished.

In the modification shown in FIGURES 20-22, a pair of straight independently movable cutter elements, similar to the cutter elements 117A, 117B and represented by the cutter element 217B, is slidably mounted and spring-urged on the frame member 217 having an outer film-engaging surface 217S. The cutter element 217B is retained in slidable relation on the frame member 217 by a strap 217E on the frame member and having L-shaped ends 217F, 217G cooperating with ear portions 217J, 212K of the cutter 217B to prevent substantial longitudinal movement of the blade in a direction parallel to its cutting edge but allowing substantial sliding movement in a direction transverse to the cutting edge. A leaf spring 217L in the form of a plate, having one of its ends secured to a stationary frame member such as, for example, the stationary film guide 10H and having its free end engaging a slotted portion 217P in cutter 217B, urges the blade-cutting edge forwardly so that normally the cutting edge is slightly rearward of the plane of surface 217S, as described above in connection with FIGURE 19, and urged against the adjacent inner surface of the film guide.

In the arrangement shown in FIGURE 23, the straight cutters 317A, 317B are each individually slidable in slotted portions in the frame member 317 having the film-engaging surface 317S and are normally urged to an extended position by individual leaf springs 317K, 317L which are normally bowed upwardly in FIGURE 23 and engaging the lip portion 317T due to the frame being retracted. The springs 317K, 317L each have one of their ends secured to a stationary part of the apparatus as, for example, corresponding film guides 10G, 10H and have their other ends engaging an apertured portion of cutter blades 317A, 317B.

In operation of the arrangement shown in FIGURE 23, initially the frame member 317 and shear blades 317A, 317B move together since the blades are urged by the leaf springs. Then the leaf springs bottom against the film guides to stop the corresponding blade from further travel while the frame member continues through the cutter and guide assemblies to carry the cut film chip to and against the adhesive carrier, i.e., cover sheet, on the card.

It is noted that the cutter blades 317A, 317B have cutting edges on each end as well as two apertured portions for leaf-spring engagement whereby either cutting edge may be used for cutting film, i.e., the cutter blade is reversible.

These constructions involving "spring" loading of the moving cutter elements against the stationary film guides results in a more positive shearing action, results in self-sharpening of opposing cutting edges, longer life of the cutting edges, enhanced field maintainability and serviceability, and, due to the above described side loading of the cutters, assures close fit between edges of moving and fixed cutter members as these edges wear, and also results in reduced field maintenance since worn blades can be replaced with less dismantling.

The particular manner in which the film is supported, i.e., as a cantilever during the cutting operation is of particular advantage in those instances where the film, such as, for example, unexposed film, is of such nature that scratching is to be avoided, otherwise occasioned, for example, when such film is fed not to, but from, the cutting station with a support over which the film is required to be pulled. The present arrangement, involving feeding of the film to the cutting station as a cantilever-supported film, also has the advantage that a stop member may be provided on the stationary support with such stop member being engaged by the forward leading edge of the fed film and with the stop member being spaced a predetermined distance from the cutting elements so that when the film engages the stop member, the film is properly indexed for a cutting operation, thereby requiring no visual alignment; and, indeed, the stop may have associated therewith a control switch which is actuated when the film engages the stop members to control the energization of a driving motor in those instances where the film mounter is motor operated instead of being manually operated.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a film mounter of the character described, a support, film-feed means on said support for feeding a film web, a pair of spaced film guides on said support through which said feed means threads a section of film with said section being supported by said feed means as a cantilever in said guides, and a pair of spaced cutting elements movably mounted on said support and cooperating with edges of said film guide to sever said film, one of said cutting elements serving to trim the forward edge of the film and the other one of said cutting elements serving to sever said section from said web, said cutting elements being on a frame member, film guide means extending in the direction of film travel between said film guides for assuring film movement from one of said film guides to and through the other of said film guides, means movably mounting said film guide means on said support, means for moving said frame member, said frame member when moved by the last-mentioned means serving to move said guide means out of the path of movement of said frame member.

2. An arrangement as set forth in claim 1 including a card support for an apertured card having a thin adhesive sheet extending into the apertured portion of the card, and said frame member contacting the severed section of film into said apertured portion against said adhesive sheet.

3. An arrangement as set forth in claim 2 in which said card support includes a heated pressure pad having a heated marginal peripheral portion contacting a portion of the sheet.

4. An arrangement as set forth in claim 3 including means pivotally mounting said frame on said support, means pivotally mounting said pressure pad on said support, means mounting said pressure pad on the last-mentioned means for freedom of movement about two different axes, and common actuating means for moving both said frame member and said pressure pad towards each other.

5. In a film mounter of the character described, a support for supporting an apertured card having a thin adhesive sheet extending into the apertured portion of the card, a stop member on said support engageable with said card to index it with respect to said support, a pair of frame members pivotally mounted on said support about a common axis, one of said frame members carrying a pair of spaced cutting elements, the other of said frame members carrying a pressure pad, a pair of film-cutting elements mounted on said support between said frame members and each cooperating respectively with one of the first-mentioned cutting elements to sever film, single actuating means for jointly pivoting both of said frame members towards each other to produce a cutting action between said cutting elements, said one frame having a portion thereof engageable with the cut film to press it into the apertured portion of the card backed by said pressure pad.

6. The arrangement as set forth in claim 5 including means mounting said pressure pad on said other frame member for universal movement thereon.

7. An arrangement as set forth in claim 5 in which said single actuating means includes a shaft, an arm on said shaft, a pressure roller on said arm engageable with a portion of said one frame, a cam roller on said arm engageable with an opended cam slotted portion in said other frame, tension spring means connected between said one frame and said arm to normally press said pressure roller into engagement with said frame portion, said shaft upon rotation being effective to cause said cam roller to cooperate with said cam slotted portion to pivot said other frame towards said one frame and to clamp film therebetween and to subsequently cause said pressure roller to move out of engagement with said frame portion to allow said spring means to apply increased force to said film.

8. In a film mounter of the character described, a support, a pair of frame members each pivotally mounted on said support about a common axis, film-cutting and engaging means on one end of one of said frame members, card-backing means on one end of the other of said frame members and adjacent to said film-cutting and engaging means, a shaft on said support between said axis and said ends of said frame members, an arm on said shaft, spring means acting between said arm and said one frame member, stop means between said arm and said one frame member and normally limiting that relative movement therebetween otherwise caused by said spring means, means on said arm cooperating with said other frame member for pivoting said other frame member about said common axis, said shaft being effective upon rotation to cause said other frame member to be pivoted about said common axis and to disable said stop means to allow said spring means to pivot said one frame member about said common axis and towards said other frame member.

9. An arrangement as set forth in claim 8 in which said card-backing means is resiliently mounted on said other frame member.

10. An arrangement as set forth in claim 8 in which said backing means is universally mounted on said other frame member.

11. An arrangement as set forth in claim 8 in which said backing means is a heated element.

12. In a film mounter of the character described, a support, a pair of adjacent film-engaging rollers mounted with their axes extending generally vertically on said support, spring means acting between said rollers to grip film therebetween, a pair of vertically extending and spaced film guides on said support having elongated openings therein with the longitudinal axis of each of said openings extending transversely with respect to film fed therethrough by said rollers, said rollers gripping the film to support an end of said film as a cantilever in said guides and cutting elements movably mounted on said support and cooperating with said guides to severe film.

13. An arrangement as set forth in claim 12 including a pair of movable film guides movably mounted on said support between the previously mentioned guides with elongated slotted portions therein overlying the marginal edges of the film, spring means urging said movable film guides towards the film, and movable means carrying said cutting elements for engaging and moving said movable guides outwardly and away from said previously mentioned guides during the cutting action.

14. In a film mounter of the character described, film-cutting means, card-backing means, common means effective to move each of said means, spring means normally tending to move said film-cutting means towards said backing means, stop means normally limiting such movement of said film-cutting means by said spring means, said common means incorporating means actuable in one direction for moving said backing means to a backing position and thereafter disabling said stop means to allow said film cutting means to move with respect to said backing means solely under the influence of said spring means when said backing means is in said backing position.

15. An arrangement as set forth in claim 14 in which said backing means incorporates a card-engaging element which is resiliently mounted on said backing means.

16. In a film mounter of the character described, a support, film-feed means on said support for feeding a film web, a pair of spaced film guides on said support through which said feed means threads a section of film with said section being supported by said feed means a cantilever in said guides, and a pair of spaced cutting elements movably mounted on said support and cooperating with edges of said film guide to sever said film, one of said cutting elements serving to trim the forward edge of the film and the other one of said cutting elements serving to sever said section from said web, said cutting elements being resilient blades carried on a member pivoted on said support with the blades pressing themselves against an inner surface of a corresponding one of said film guides.

17. In a film mounter of the character described, a support, film-feed means on said support for feeding a film web, a pair of spaced film guides on said support through which said feed means threads a section of film with said section being supported by said feed means as a cantilever in said guides, and a pair of spaced cutting elements movably mounted on said support and cooperating with edges of said film guide to sever said film, one of said cutting elements serving to trim the forward edge of the film and the other one of said cutting elements serving to sever said section from said web, said cutting elements being movably mounted on a member pivoted on said support, and individual spring means acting between said support and a corresponding one of said cutting elements to urge them into engagement with a corresponding inner adjacent surface of the film guides.

References Cited by the Examiner

UNITED STATES PATENTS

| | | | |
|---|---|---|---|
| 2,477,295 | 7/1949 | Garwood | 83—608 |
| 2,555,218 | 5/1951 | Bailey | 156—108 |
| 3,163,570 | 12/1964 | Brundage | 156—514 |
| 3,169,896 | 2/1965 | Dresser | 156—507 |

EARL M. BERGERT, *Primary Examiner.*

DOUGLAS J. DRUMMOND, *Examiner.*